United States Patent
Seaton, Jr. et al.

(10) Patent No.: US 7,702,916 B2
(45) Date of Patent: Apr. 20, 2010

(54) METHOD AND SYSTEM FOR SECURE AUTHENTICATION

(75) Inventors: Robert W. Seaton, Jr., Austin, TX (US); Terence Spielman, Austin, TX (US); Penny Cornwell, Austin, TX (US); Neal Blackwood, Austin, TX (US); Michael T. Clay, Austin, TX (US)

(73) Assignee: VISA U.S.A. Inc., San Francisco, CA (US)

( * ) Notice: Subject to any disclaimer, the term of this patent is extended or adjusted under 35 U.S.C. 154(b) by 1185 days.

(21) Appl. No.: 10/816,455

(22) Filed: Mar. 31, 2004

(65) Prior Publication Data

US 2005/0036611 A1 Feb. 17, 2005

Related U.S. Application Data

(60) Provisional application No. 60/459,508, filed on Mar. 31, 2003.

(51) Int. Cl.
*H04L 29/06* (2006.01)
*G06F 21/00* (2006.01)
(52) U.S. Cl. .............................. 713/185; 705/72; 726/9
(58) Field of Classification Search .................. 380/44; 705/72
See application file for complete search history.

(56) References Cited

U.S. PATENT DOCUMENTS

| | | | |
|---|---|---|---|
| 4,423,287 A | 12/1983 | Zeidler | |
| 4,485,300 A | 11/1984 | Peirce | |
| 4,578,530 A | 3/1986 | Zeidler | |
| 4,605,820 A | 8/1986 | Campbell, Jr. | |
| 4,646,351 A | 2/1987 | Asbo et al. | |
| D290,136 S | 6/1987 | Ball et al. | |
| 4,701,601 A | 10/1987 | Francini et al. | |
| 4,704,648 A | 11/1987 | Monia | |
| 4,734,145 A | 3/1988 | Monia | |
| 4,734,564 A | 3/1988 | Boston et al. | |
| 4,755,246 A | 7/1988 | Monia | |
| 4,766,293 A | 8/1988 | Boston | |
| 4,812,628 A | 3/1989 | Boston et al. | |
| 4,822,985 A | 4/1989 | Boggan et al. | |

(Continued)

FOREIGN PATENT DOCUMENTS

WO WO 00/74007 A1 12/2000

(Continued)

*Primary Examiner*—Gilberto Barron, Jr.
*Assistant Examiner*—Yonas Bayou
(74) *Attorney, Agent, or Firm*—Townsend and Townsend and Crew LLP

(57) ABSTRACT

A system and method configured to provide secure Personal Identification Number (PIN) based authentication is disclosed. A passcode or PIN associated with a customer value card can be securely authenticated by an issuer prior to authorizing payment. An Access Control Server (ACS) can receive the PIN or passcode from a customer via a secure connection over a public network. The ACS can generate an encrypted PIN and can communicate the encrypted PIN to a remote issuer for authentication. The ACS can use one or more hardware security modules to generate the encrypted PIN. The hardware security modules can be emulated in software or implemented in hardware. The system can be configured such that the PIN is not exposed in an unencrypted form in a communication link or in hardware other than the originating customer terminal.

34 Claims, 9 Drawing Sheets

U.S. PATENT DOCUMENTS

| | | |
|---|---|---|
| 4,870,259 A | 9/1989 | Boggan et al. |
| 4,906,826 A | 3/1990 | Spencer |
| 4,908,521 A | 3/1990 | Boggan et al. |
| 4,943,707 A | 7/1990 | Boggan |
| D310,386 S | 9/1990 | Michels et al. |
| 5,012,239 A | 4/1991 | Griebeler |
| 5,136,633 A | 8/1992 | Tejada et al. |
| 5,177,342 A | 1/1993 | Adams |
| 5,255,182 A | 10/1993 | Adams |
| 5,278,737 A | 1/1994 | Luce et al. |
| 5,384,449 A | 1/1995 | Peirce |
| 5,396,624 A | 3/1995 | Campbell et al. |
| 5,465,206 A | 11/1995 | Hilt et al. |
| 5,477,038 A | 12/1995 | Levine et al. |
| 5,500,513 A | 3/1996 | Langhans et al. |
| 5,526,409 A | 6/1996 | Conrow et al. |
| 5,621,201 A | 4/1997 | Langhans et al. |
| 5,703,344 A | 12/1997 | Bezy et al. |
| 5,745,576 A | 4/1998 | Abraham et al. |
| 5,761,306 A | 6/1998 | Lewis |
| 5,920,847 A | 7/1999 | Kolling et al. |
| 5,963,925 A | 10/1999 | Kolling et al. |
| RE36,365 E | 11/1999 | Levine et al. |
| 5,991,749 A * | 11/1999 | Morrill, Jr. .................. 705/44 |
| 6,003,014 A | 12/1999 | Lee et al. |
| 6,003,763 A | 12/1999 | Gallagher et al. |
| 6,005,942 A | 12/1999 | Chan et al. |
| 6,018,717 A | 1/2000 | Lee et al. |
| 6,018,723 A | 1/2000 | Siegel et al. |
| D421,505 S | 3/2000 | Hastings et al. |
| RE36,788 E | 7/2000 | Mansvelt et al. |
| 6,105,008 A | 8/2000 | Davis et al. |
| 6,119,103 A | 9/2000 | Basch et al. |
| 6,128,391 A | 10/2000 | Denno et al. |
| 6,179,205 B1 | 1/2001 | Sloan |
| RE37,122 E | 4/2001 | Levine et al. |
| D441,483 S | 5/2001 | Schaefer et al. |
| D442,314 S | 5/2001 | Schaefer et al. |
| D442,315 S | 5/2001 | Schaefer et al. |
| 6,233,683 B1 | 5/2001 | Chan et al. |
| 6,240,187 B1 | 5/2001 | Lewis |
| 6,247,129 B1 | 6/2001 | Keathley et al. |
| D444,587 S | 7/2001 | Hastings et al. |
| D445,941 S | 7/2001 | Schaefer et al. |
| 6,273,335 B1 | 8/2001 | Sloan |
| 6,282,522 B1 | 8/2001 | Davis et al. |
| 6,285,991 B1 | 9/2001 | Powar |
| 6,298,336 B1 | 10/2001 | Davis et al. |
| 6,298,991 B1 | 10/2001 | Tsai |
| 6,367,011 B1 | 4/2002 | Lee et al. |
| 6,370,648 B1 | 4/2002 | Diep |
| 6,385,595 B1 | 5/2002 | Kolling et al. |
| 6,402,028 B1 | 6/2002 | Graham, Jr. et al. |
| 6,408,284 B1 | 6/2002 | Hilt et al. |
| 6,430,708 B1 | 8/2002 | Evans |
| 6,438,527 B1 | 8/2002 | Powar |
| 6,481,632 B2 | 11/2002 | Wentker et al. |
| 6,549,912 B1 | 4/2003 | Chen |
| 6,560,581 B1 | 5/2003 | Fox et al. |
| 6,598,030 B1 | 7/2003 | Siegel et al. |
| RE38,255 E | 9/2003 | Levine et al. |
| 6,658,393 B1 | 12/2003 | Basch et al. |
| 6,671,811 B1 | 12/2003 | Diep et al. |
| 6,769,066 B1 | 7/2004 | Botros et al. |
| 6,808,111 B2 | 10/2004 | Kashef et al. |
| 6,837,425 B2 | 1/2005 | Gauthier et al. |
| 6,920,611 B1 | 7/2005 | Spaeth et al. |
| 6,980,973 B1 | 12/2005 | Karpenko |
| 7,007,840 B2 | 3/2006 | Davis |
| 7,028,008 B2 | 4/2006 | Powar |
| 7,039,611 B2 | 5/2006 | Devine |
| 7,051,923 B2 | 5/2006 | Nguyen et al. |
| 7,104,446 B2 | 9/2006 | Bortolin et al. |
| 7,121,456 B2 | 10/2006 | Spaeth et al. |
| 7,124,937 B2 | 10/2006 | Myers et al. |
| 7,152,780 B2 | 12/2006 | Gauthier et al. |
| 7,152,782 B2 | 12/2006 | Shenker et al. |
| 7,227,950 B2 | 6/2007 | Faith et al. |
| 7,243,853 B1 | 7/2007 | Levy et al. |
| 7,280,981 B2 | 10/2007 | Huang et al. |
| 2002/0031225 A1 | 3/2002 | Hines |
| 2002/0111919 A1 | 8/2002 | Weller et al. |
| 2002/0123972 A1 * | 9/2002 | Hodgson et al. .................. 705/72 |
| 2002/0161704 A1 | 10/2002 | Powar |
| 2002/0178112 A1 | 11/2002 | Goeller et al. |
| 2002/0194138 A1 | 12/2002 | Dominguez et al. |
| 2002/0194503 A1 | 12/2002 | Faith et al. |
| 2003/0120593 A1 | 6/2003 | Bansal et al. |
| 2003/0172040 A1 | 9/2003 | Kemper et al. |
| 2003/0195843 A1 | 10/2003 | Matsuda et al. |
| 2003/0200184 A1 | 10/2003 | Dominguez et al. |
| 2003/0212642 A1 | 11/2003 | Weller et al. |
| 2003/0233292 A1 | 12/2003 | Richey et al. |
| 2004/0019522 A1 | 1/2004 | Bortolin et al. |
| 2004/0044621 A1 | 3/2004 | Huang et al. |
| 2004/0050922 A1 | 3/2004 | Gauthier et al. |
| 2004/0054581 A1 | 3/2004 | Redford et al. |
| 2004/0054590 A1 | 3/2004 | Redford et al. |
| 2004/0054591 A1 | 3/2004 | Spaeth et al. |
| 2004/0059688 A1 | 3/2004 | Dominguez et al. |
| 2004/0139021 A1 | 7/2004 | Reed et al. |
| 2004/0148224 A1 | 7/2004 | Gauthier et al. |
| 2004/0153715 A1 | 8/2004 | Spaeth et al. |
| 2004/0210566 A1 | 10/2004 | Smith et al. |
| 2004/0220964 A1 | 11/2004 | Shiftan et al. |
| 2004/0225627 A1 | 11/2004 | Botros et al. |
| 2005/0021456 A1 | 1/2005 | Steele et al. |
| 2005/0029344 A1 | 2/2005 | Davis |
| 2005/0036611 A1 | 2/2005 | Seaton et al. |
| 2005/0045718 A1 | 3/2005 | Bortolin et al. |
| 2005/0058427 A1 | 3/2005 | Nguyen et al. |
| 2005/0071225 A1 | 3/2005 | Bortolin et al. |
| 2005/0071226 A1 | 3/2005 | Nguyen et al. |
| 2005/0071227 A1 | 3/2005 | Hammad et al. |
| 2005/0071228 A1 | 3/2005 | Bortolin et al. |
| 2005/0071235 A1 | 3/2005 | Nguyen et al. |
| 2005/0102234 A1 | 5/2005 | Devine |
| 2005/0121506 A1 | 6/2005 | Gauthier et al. |
| 2005/0149455 A1 | 7/2005 | Bruesewitz et al. |
| 2005/0154877 A1 | 7/2005 | Trench |
| 2005/0177510 A1 | 8/2005 | Hilt et al. |
| 2005/0246278 A1 | 11/2005 | Gerber et al. |
| 2005/0283416 A1 | 12/2005 | Reid et al. |
| 2005/0283430 A1 | 12/2005 | Reid et al. |
| 2005/0283431 A1 | 12/2005 | Reid et al. |
| 2005/0283432 A1 | 12/2005 | Reid et al. |
| 2005/0283433 A1 | 12/2005 | Reid et al. |
| 2006/0006224 A1 | 1/2006 | Modi |
| 2006/0080243 A1 | 4/2006 | Kemper et al. |
| 2006/0155644 A1 | 7/2006 | Reid et al. |
| 2006/0163345 A1 | 7/2006 | Myers et al. |
| 2006/0178957 A1 | 8/2006 | LeClaire |
| 2006/0179007 A1 | 8/2006 | Davis |
| 2006/0290501 A1 | 12/2006 | Hammad et al. |
| 2006/0293027 A1 | 12/2006 | Hammad et al. |
| 2007/0001000 A1 | 1/2007 | Nguyen et al. |
| 2007/0001001 A1 | 1/2007 | Myers et al. |
| 2007/0005613 A1 | 1/2007 | Singh et al. |
| 2007/0005774 A1 | 1/2007 | Singh et al. |
| 2007/0012764 A1 | 1/2007 | Bortolin et al. |
| 2007/0017970 A1 | 1/2007 | Gauthier et al. |
| 2007/0034679 A1 | 2/2007 | Gauthier et al. |
| 2007/0055597 A1 | 3/2007 | Patel et al. |
| 2007/0055630 A1 | 3/2007 | Gauthier et al. |

| | | |
|---|---|---|
| 2007/0057034 A1 | 3/2007 | Gauthier et al. |
| 2007/0057051 A1 | 3/2007 | Bortolin et al. |
| 2007/0083465 A1 | 4/2007 | Ciurea et al. |
| 2007/0100691 A1 | 5/2007 | Patterson |
| 2007/0125842 A1 | 6/2007 | Antoo et al. |

FOREIGN PATENT DOCUMENTS

| | | |
|---|---|---|
| WO | WO 00/79457 A1 | 12/2000 |
| WO | WO 200/079603 A1 | 9/2004 |

* cited by examiner

600

```
<html>
<head><title>PIN Entry Page</title></head>
<body>
610  <form method=POST name="PIN_Entry" action="https://www.acs-
        vbv.visa.com:9123/" autocomplete="off">
<p>Please enter your PIN:<p>
<table>
<tr><td>PIN:</td><td><INPUT TYPE="PASSWORD" name="pin"></td></tr>
</table>
620  <INPUT TYPE="hidden" name="TXNUUID" value="foo">
630  <INPUT TYPE="hidden" name="RDIR_URL" value=https://redirect.url/>
640  <INPUT TYPE="hidden" name="RDIR_TYPE" value="303">
650  <INPUT TYPE="hidden" name="GEP_MAC" value="Mxkskdhjsfhaiaskdsfj==">

<p><INPUT TYPE=submit VALUE="Submit"><p>
</form>
</body>
</html>
```

| Field | Description |
|---|---|
| TXNUUID | A Unique Transaction ID |
| RDIR_URL | The base redirection url (back to the ACS from HSM1). |
| RDIR_TYPE | Indicates the HTTP redirect type the HSM1 should return. The ACS will determine this value when initially receiving the PAReq by evaluating the UserAgent and HTTP version of the cardholder browser. The value will either be 302 or 303. |
| GEP_MAC | HMAC(k1,TXNUUID | RDIR_URL | RDIR_TYPE) |

| Field | Description |
|---|---|
| EPIN1 | The ISO 9564 Format-1 PINBLOCK encrypted under a key shared between HSM1 (front-end HSM) and HSM2 (the back-end HSM). |
| | This value shall be base64 encoded before being placed on the redirection URL. |

FIG. 8

METHOD AND SYSTEM FOR SECURE AUTHENTICATION

CROSS-REFERENCES TO RELATED APPLICATIONS

This application claims the benefit of U.S. Provisional Application No. 60/459,508, filed Mar. 31, 2003, entitled METHOD AND SYSTEM FOR PROTECTING INFORMATION ENTERED VIA INTERNET WEB PAGES, hereby incorporated herein by reference in its entirety.

BACKGROUND OF THE INVENTION

The present disclosure generally relates to protecting information transmitted in a computer network and, more specifically, to protecting passcode information transmitted via the Internet.

Electronic commerce, also referred to as e-commerce, provides the opportunity for merchants to reach consumers that are outside of a geographic region normally associated with a physical storefront. However, a merchant implementing electronic commerce needs to address the associated issues of customer payment, payment authentication, and payment authorization.

A merchant can accept, for example, customer credit cards or debit cards for payment. The merchant may authenticate a payment card presented by a customer in a physical storefront. The merchant can compare a customer signature in a field on the back of the card to the signature provided on a sales receipt. Additionally, the merchant may authenticate the customer by asking for an independent picture identification such as a driver's license. A merchant may also electronically authenticate a payment card received from a customer at a physical storefront. The merchant can read information typically stored on a magnetic stripe on the back of the payment card. The merchant can read the information on a point of sale device located at the checkout counter. The point of sale device can be connected to an issuer network. The payment card issuer can authenticate the payment card by comparing the information stored on the magnetic stripe to corresponding information stored in an issuer database. The point of sale device can be configured to provide an additional measure of security by asking for a Personal Identification Number (PIN) or passcode associated with the payment card. Presumably, only an authorized user has access to the passcode. The customer maintains control over the payment card and passcode throughout the transaction and the merchant typically has no ability to access the customer's passcode. The customer provides the passcode directly to the point of sale device, which is connected to the payment card issuer network.

A merchant and customer engaged in an electronic commerce transaction complicate the authentication process. The merchant does not have physical access to the payment card. Additionally, a customer may be hesitant to supply a passcode to a merchant.

Secure communication links, such as Secure Sockets Layer (SSL) connections authenticate the parties and secure the information provided using the connection. However, such security protocols do not contribute to authenticating a payment card. Additionally, such security protocols do not provide a consumer with any level of confidence that a passcode is not stored in unencrypted form on a merchant server or database.

Hence it is desirable to provide a system for authenticating a payment card that securely maintains consumer personal information such as passcode information. The authentication system should allow secure payment card authentication and should not compromise the security of any underlying authentication networks.

BRIEF SUMMARY OF THE INVENTION

A system and method to provide secure Personal Identification Number (PIN) based authentication is disclosed. A passcode or PIN associated with a customer value card can be securely authenticated by an issuer prior to authorizing payment. An Access Control Server (ACS) can receive the PIN or passcode from a customer via a secure connection over a public network. The ACS can generate an encrypted PIN and can communicate the encrypted PIN to a remote issuer for authentication. The ACS can use one or more hardware security modules to generate the encrypted PIN. The hardware security modules can be emulated in software or implemented in hardware. The system can be configured such that the PIN is not exposed in an unencrypted form in a communication link or in hardware other than the originating customer terminal.

In one aspect, the disclosure includes a secure passcode authentication system. The system can include an Access Control Server (ACS) configured to receive a request for passcode authentication of a Primary Account Number (PAN), and configured to request a passcode corresponding to the PAN, a front end Hardware Security Module (HSM) coupled to the ACS, and configured to receive the passcode and generate an encrypted passcode using a local encryption key, and a back end HSM configured to receive the encrypted passcode from the front end HSM and further configured to recover a clear form of the passcode, generate a back end encrypted passcode, and communicate the back end encrypted passcode to an authentication network.

In another aspect, the disclosure includes a secure passcode authentication system. The system can include an Access Control Server (ACS) configured to receive a request for Personal Identification Number (PIN) authentication of a Primary Account Number (PAN), and configured to generate a request for a PIN corresponding to the PAN. The request for the PIN can include hidden fields including a unique transaction identifier and a hash value. The system can also include a front end Hardware Security Module (HSM) coupled to the ACS, and configured to generate the hash value based in part on the unique transaction identifier, and further configured to receive an encrypted PIN, decrypt the PIN to recover a clear form of the PIN, and generate a local encrypted PIN using a local encryption key, and a back end HSM configured to receive the local encrypted PIN from the front end HSM and further configured to recover a clear form of the PIN from the local encrypted PIN, generate an Acquirer Working Key (AWK) encrypted PIN, and communicate the AWK encrypted PIN to an authentication network.

In still another aspect, the disclosure includes a secure passcode authentication system. The system can include an Access Control Server (ACS) configured to receive a request for Personal Identification Number (PIN) authentication of a Primary Account Number (PAN), and configured to generate a request for a PIN corresponding to the PAN, the request for the PIN including an instruction to provide the PIN to a destination address, and a front end Hardware Security Module (HSM) having the destination address and coupled to the ACS, and configured to receive an encrypted PIN, decrypt the PIN to recover a clear form of the PIN, and generate an Acquirer Working Key (AWK) encrypted PIN using an AWK encryption key, and configured to communicate the AWK encrypted PIN to an authentication network.

In yet another aspect, the disclosure includes a method of secure passcode authentication. The method can include requesting a Personal Identification Number (PIN) corresponding to a Primary Account Number (PAN), receiving the PIN in response to the request, generating a PINBLOCK based in part on the PIN, encrypting the PINBLOCK using a local key in a front end Hardware Security Module (HSM) to generate a local key encrypted PINBLOCK, decrypting the local key encrypted PINBLOCK with a back end HSM, generating a back end encrypted PIN with the back end HSM, communicating the back end encrypted PIN to an authentication network, and receiving an authentication response from the authentication network.

In yet another aspect, the disclosure can include a method of secure passcode authentication. The method can include receiving an encrypted Personal Identification Number (PIN) corresponding to a Primary Account Number (PAN), decrypting the encrypted PIN in a front end Hardware Security Module (HSM) to generate a clear form of the PIN, generating a PINBLOCK based in part on the clear form of the PIN, generating in a back end HSM a back end encrypted PIN based in part on the PINBLOCK, communicating the back end encrypted PIN to an authentication network, and receiving an authentication response from the authentication network.

In yet another aspect, the disclosure can include a method of secure passcode authentication. The method can include generating encryption data, querying a cardholder for a Personal Identification Number (PIN) corresponding to a Primary Account Number (PAN), receiving an encrypted PIN and at least a portion of the encryption data in response to the query, generating a clear form of the PIN based in part on the encrypted PIN, generating a PINBLOCK based in part on the clear form of the PIN, encrypting the PINBLOCK in a front end Hardware Security Module (HSM) using triple DES encryption to generate an encrypted PIN (EPIN), decrypting the EPIN in a back end HSM to recover the clear form of the PIN, encrypting the clear form of the PIN in the back end HSM using an Acquirer Working Key (AWK) to generate an AWK encrypted PIN, communicating the AWK encrypted PIN to an authentication network, and receiving an authentication response.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

FIG. 6 is an embodiment of a passcode entry form used in one embodiment of a passcode authentication process.

FIG. 7 is an example of encryption data fields used in an embodiment of a secure authentication process.

FIG. 8 is an example of return encryption fields used in an embodiment of a secure authentication process.

DETAILED DESCRIPTION OF THE INVENTION

Figure 1:
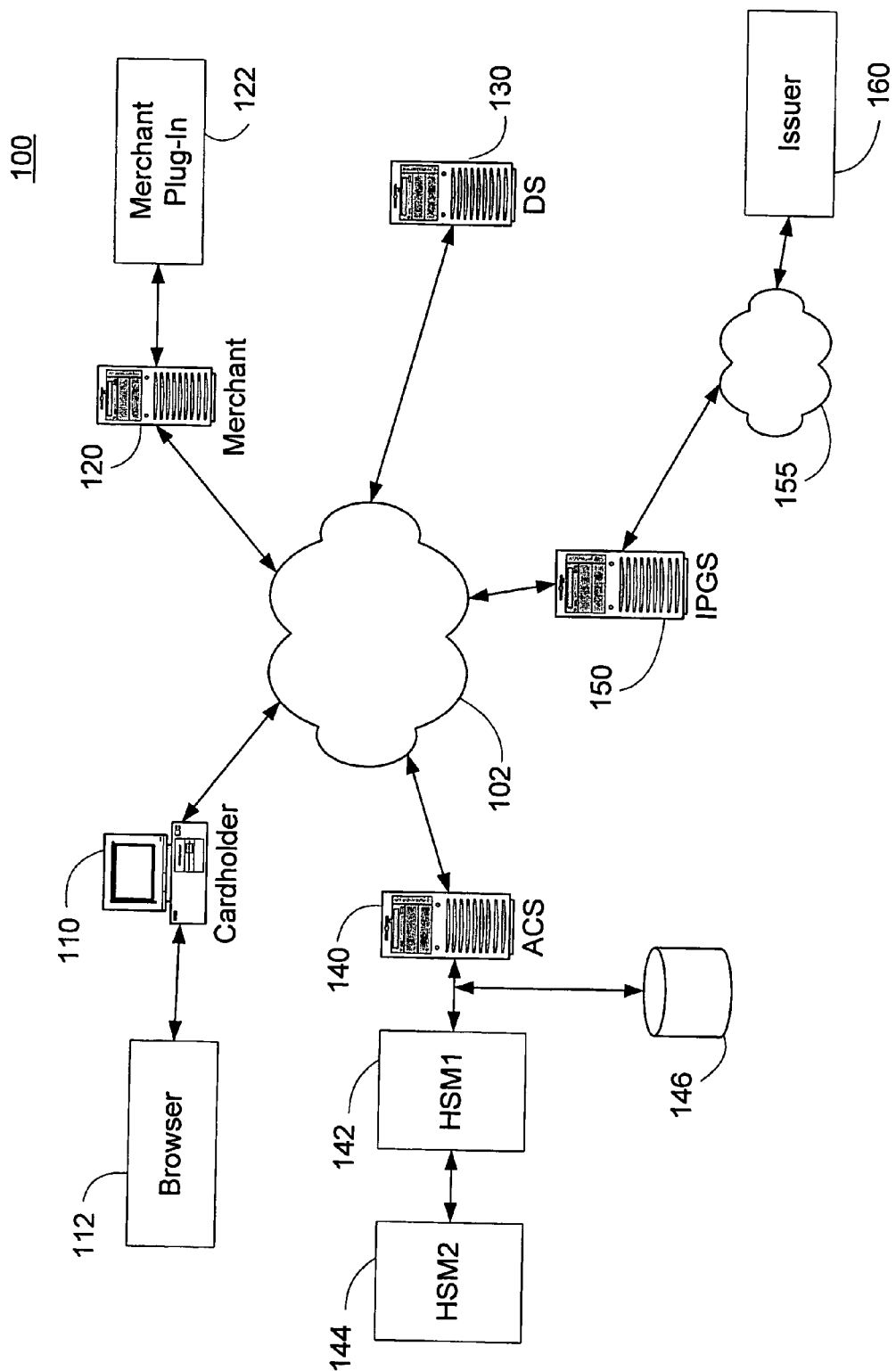
FIG. 1 is a functional block diagram of an embodiment of a secure authentication system.

The invention in the form of one or more exemplary embodiments is described below. A method and system for secure authentication of payment cards in an electronic commerce environment is disclosed. A merchant can reduce consumer fraud in electronic commerce transactions by authenticating payment card numbers presented by a customer. The merchant can authenticate the payment card numbers using an issuer authentication network. A customer that is a party to an electronic commerce transaction can ensure that a passcode, such as a PIN, password, or some other authentication code submitted to an electronic commerce site will remain secure.

A merchant can establish an electronic commerce site on a public network, such as the Internet. A customer can access an electronic commerce web site and shop for goods or services. After selecting desired goods and services, the customer can proceed to checkout in a process that can be similar to the checking out process used in a physical merchant location. The customer can elect to pay for the desired goods and services using a credit card, debit card, stored value card, and the like, or some other type of payment card. The customer can submit, for example, the credit card or debit card number to the merchant.

The merchant can receive the payment card number and submit the number to an issuing authority to have it authenticated. Additionally, especially in the case of debit cards, the customer may need to provide a passcode, such as a password, an authentication code, or PIN to successfully authenticate the card number.

As noted above, the communication system used to connect the customer to the merchant can be a public network such as the Internet. However, an issuer authentication network may be a private network. Additionally, the issuer authentication network may require the customer payment card number or passcode information to be supplied using a protocol different from the communication protocol used in the connection between the customer and the merchant. The issuer authentication network may utilize an encryption key to encrypt information communicated across the network. The issuer authentication network can maintain the security of the network by not exposing the encryption key outside of the network.

However, because the merchant is unable to provide the encryption key to a customer, the payment card number and any associated passcode may need to be recovered prior to encrypting with the encryption key used by the issuer authentication network.

The customer typically prefers the passcode not appear in clear form, that is in unencrypted form, except when decrypted by the issuer. The disclosed system and method allows a payment card having a passcode received in a front end system using a front end communication protocol to be authenticated in an issuer authentication network using an encryption key and communication protocol that is not exposed to the customer.

The disclosed system and method allow a payment card number and associated passcode to be received in a front end system and securely handed to a secure back end system while substantially minimizing or eliminating storage of the customer information in clear form. The disclosed system and method also minimize exposure of the back end security measures outside of the back end system.

FIG. 1 is a functional block diagram of an embodiment of the secure authentication system 100. The system 100 includes a cardholder device 110 in communication with a merchant device via a network 102. In one embodiment, the cardholder device 110 includes a browser 112 running on a computer. The merchant device can be, for example, a merchant server 120 hosting an electronic commerce application. The merchant server 120 can include a merchant module 122 configured to perform portions of the electronic commerce functions, as will be described in further detail below. In an embodiment, the cardholder device 110 can connect over a network 102, such as the Internet, to the merchant server 120 and engage in an electronic commerce transaction.

The system 100 can also include a directory server 130 coupled to the network 102. The directory server 130 can be configured to determine whether a particular payment card number is within a range of numbers participating in the authentication system 100. An Access Control Server (ACS) 140 can also be coupled to the network 102. The ACS 140 can be coupled to a first Hardware Security Module (HSM1) 142 and a second Hardware Security Module (HSM2) 144. The hardware security modules 142 and 144 may also be referred to as host security modules because the hardware security modules may be implemented in hardware, software, or a combination of hardware and software. The hardware security modules 142 and 144 can be used to encrypt the information provided by the ACS 140 over the network 102. The ACS 140 can also be coupled to a database 146 that is used to store information relating to the participating payment card numbers, such as their associated passcodes.

A network payment gateway, which may be an Internet Payment Gateway Server (IPGS) 150 can also be coupled to the network 102. The IPGS 150 can manage authentication and acceptance of payment messages sent over the network 102. The IPGS 150 can provide an interface between the network 102 and an issuing or acquiring institution. The issuer module 160 can be coupled to the IPGS 150. In one embodiment, the IPGS 150 is coupled to the issuer module 160 via a network 155. The network 155 may be a private network or network having limited access. The issuer module 160 can be configured to provide a payment processing system that can exist for multiple types of transactions, and may not be limited to electronic commerce transactions.

In one example, a customer conducts a transaction in accordance with one embodiment of the secure authentication system 100 of FIG. 1. The customer, also referred to as the cardholder, can use the cardholder device 110 to visit a merchant website hosted on the merchant server 120. The cardholder device 110 can communicate with the merchant server 120 using a browser 112 coupled to the cardholder device 110. The customer can select desired goods or services from the merchant website and can proceed to a merchant's checkout page. At the checkout page, the cardholder device 110 and merchant server 120 may initiate a SSL session to encrypt or otherwise secure the personal information communicated over the network 102 by the cardholder device 110. The merchant server 120 can receive the relevant information transmitted by the cardholder device 110.

For example, the customer can provide a credit card number, debit card number or some other type of payment card number to one or more fields in the cardholder browser 112. The payment card number may be referred to generally as a Primary Account Number (PAN). The customer can then submit the information, typically including the PAN, customer name, and shipping address, to the merchant server 120. The cardholder device 110 can encrypt the information according to the SSL protocol before transmitting the information over the network 102 to the merchant server 120.

The merchant server 120 can receive the SSL encrypted messages and can recover the clear text, or non-encrypted information, from the messages. The merchant server 120 can use the merchant module 122, alternatively referred to as a merchant plug-in, to query the directory server 130 to verify the customer's eligibility for participation in the secure authentication system 100. Customers having card numbers that are not eligible for the secure authentication system 100 may use an alternative system or may rely on the security provided by the SSL protocol for transaction security. The directory server 130 may query an internal database, an associated database (not shown) or may query the ACS database 146 to determine eligibility of the customer's card. If the directory server 130 determines the PAN is in a participating card range, the directory server 130 can query the appropriate issuer ACS 140 to validate customer participation. The directory server 130 receives an indication from the ACS 140 and can send a response back to the merchant server plug-in 122.

The merchant server module 122 can send an authentication request to the ACS 140. In one embodiment, the merchant server module 122 sends the request via the cardholder device 110 and browser 112. The ACS 140 can determine, based in part on the PAN, if a PIN, a password, or some other type of passcode is to be used to authenticate the transaction.

If the ACS 140 determines that password-based authentication is used, the ACS 140 can query the customer for the password. The ACS 140 can transmit a query to the browser 112 in the cardholder device 110. The customer can enter the password and transmit it to the ACS 140 using the browser 112 in the cardholder device 110. The ACS 140 can authenticate the customer and PAN locally, for example, using information stored in the database 146.

If the ACS 140 determines that PIN-based authentication is used, the ACS 140 can query the customer for the PIN. The ACS 140 can transmit a query to the browser 112 in the cardholder device 110. The customer can enter the PIN and transmit it to the ACS 140 using the browser 112 in the cardholder device 110. The ACS 140 can convert the received PIN into an Acquirer Working Key (AWK) encrypted PIN-BLOCK using, for example, the first and second HSMs 142 and 144. The ACS 140 can send the AWK-encrypted PIN-BLOCK through an IPGS 150 and a network 155 to the issuer module 160 for authentication.

As noted above, the ACS 140 can perform local authentication of the password. For example, an SHA-1 hash of the password can be stored local to the ACS 140 such as in the database 146. The ACS 140 typically does not locally perform PIN-based authentication. Instead the system 100 may implement remote authentication where the authenticator is not local at the ACS 140, but may be a member bank or card issuer having a issuer module 160 that is remote from the ACS 140. This authentication may occur via the IPGS 150.

The ACS 140, whether performing local authentication or remote authentication, can return an authentication response to the merchant server module 122 via the customer browser 112 and cardholder device 110. The ACS 140 may also pass a record of the authentication to an authentication history server (not shown). The merchant server plug-in 122 may validate the authentication response. A payment authorization may take place if authentication was successful.

Although the various blocks in the system of FIG. 1 and in subsequent figures can be implemented as hardware modules, one or more of the modules may be implemented as software stored in one or more storage devices and executed by one or more processors. The various illustrative logical blocks, modules, circuits, and algorithm steps described in connection with the embodiments disclosed herein may be implemented as electronic hardware, computer software, or combinations of both.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The functions may be capable of implementation in varying ways for each particular application, but particular implementations should not be interpreted as causing a departure from the scope of the disclosure.

For example, the browser 112 may be a software application that runs on the cardholder device 110. The cardholder device 110 may be a computer, such as a personal computer, notebook computer, personal digital assistant, or some other device for computing. The cardholder device 110 may also be a point of sale device, a kiosk, a telephone such as a wireless telephone, or some other communication device.

Figure 2:
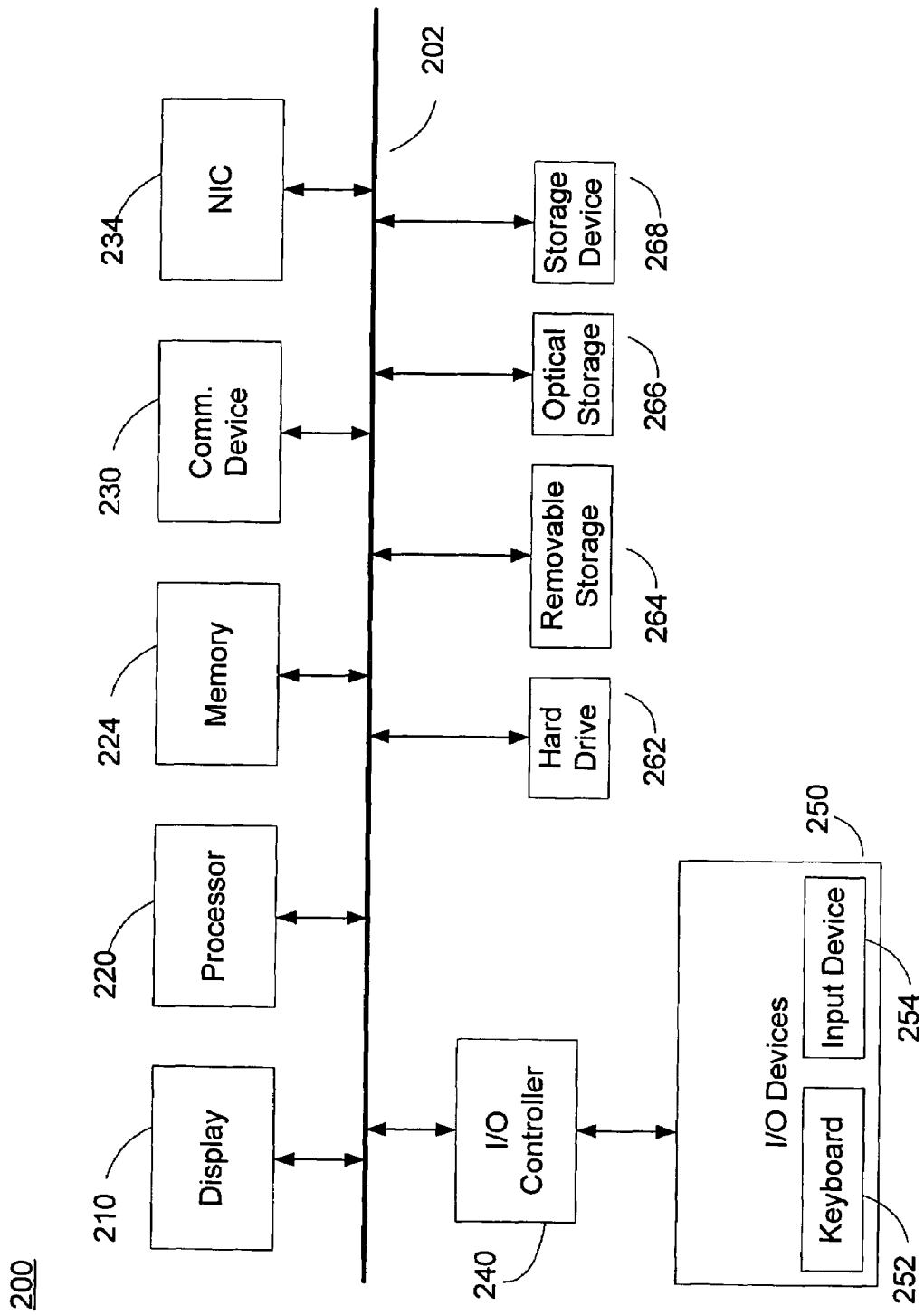
FIG. 2 is a functional block diagram of an embodiment of a communication device that can be used in the secure authentication system.

FIG. 2 is a functional block diagram of a communication device 200. Similar communication devices 200 can be used, for example as the cardholder device 110 or one of the various servers in the authentication system 100 of FIG. 1.

The communication device 200 can include a display 210, I/O devices 250 including a keyboard 252 and an input device 254, a processor 220, memory 224, an I/O controller 240, a hard drive 262, one or more removable storage drives 264, which can include a floppy drive, an optical storage 266, some other storage devices 268, a communication device 230 such as a modem, and a network interface card (NIC) 234. The various elements can be coupled using one or more computer busses 202 within the communication device 200. The one or more storage devices 268 can include, but are not limited to, ROM, RAM, non-volatile RAM, flash memory, magnetic storage, optical storage, tape storage, hard disk storage, and the like, or some other form of processor readable media.

Figure 3:
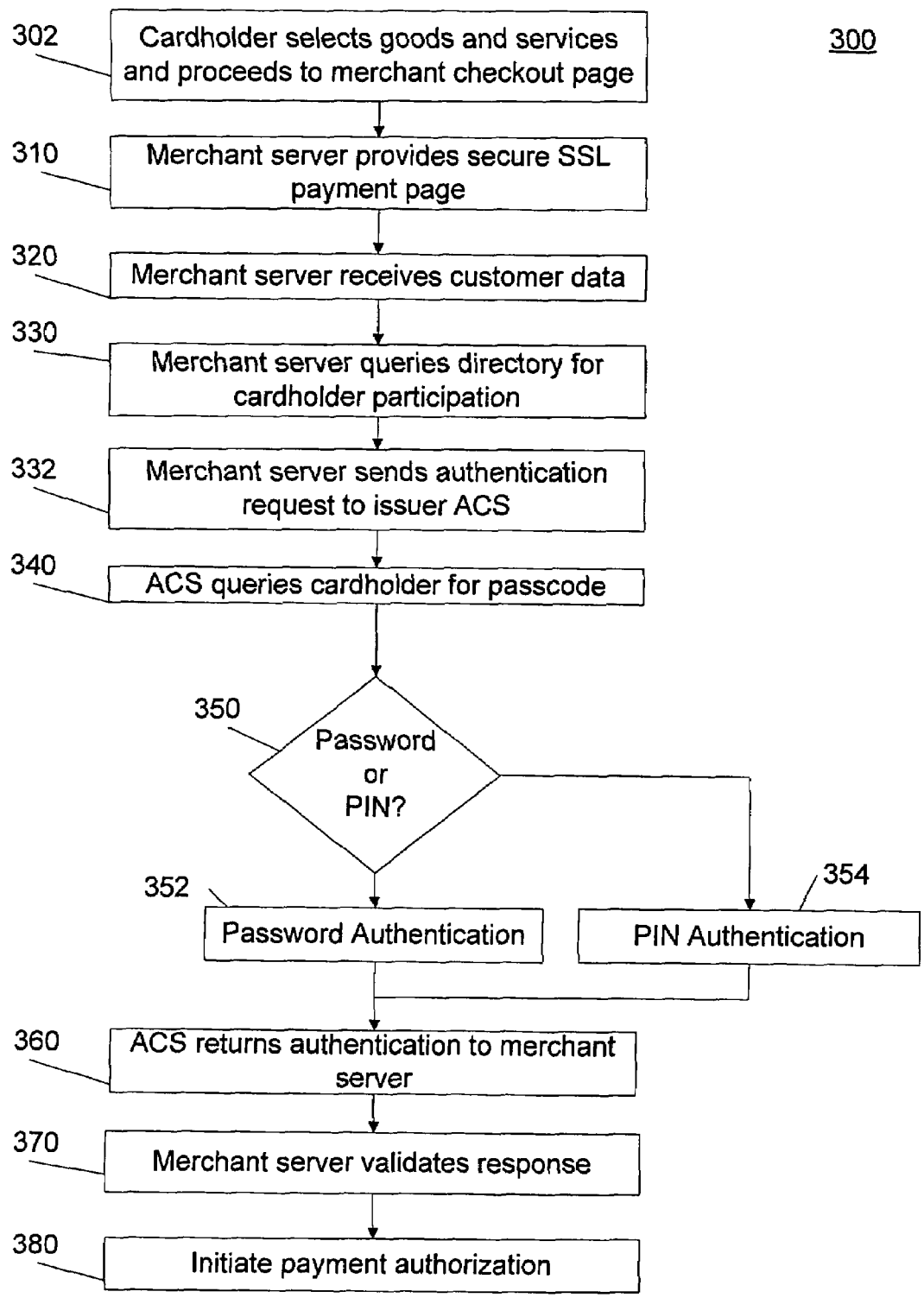
FIG. 3 is a flowchart of an embodiment of a secure authentication process.

FIG. 3 is a flowchart of an embodiment of a method 300 of secure authentication that may be implemented in the system 100 of FIG. 1. The method 300 begins at block 302 where a customer, for example using an Internet browser running on a personal computer, engages in an electronic commerce transaction with a merchant having an Internet accessible site. The customer can select desired goods or services and can proceed to a checkout page on the merchant web site.

Upon proceeding to the checkout page, the system proceeds to block 310 where the merchant server initiates an SSL connection with the customer computer, for example, by submitting payment pages which are served on a host requiring SSL. The merchant server may require an SSL connection because the checkout page may request that the customer provide confidential personal information, including name, address, type of payment card, and PAN. Because the Internet is a public network, the merchant server and customer computer may set up the SSL connection in order to secure the data exchanged during the checkout process.

After setting up the SSL connection, the system proceeds to block 320 where the merchant server queries the customer for the customer data and receives the customer data in response to the query. After receiving the customer data, which typically includes a PAN for electronic payment, the system proceeds to block 330 where the merchant server determines whether the PAN received from the customer is configured for secure authentication. The merchant server can query, for example, a database or directory server to determine if the PAN is configured for secure authentication. The directory server may return a response message to the merchant server indicating the configuration of the payment card.

The system proceeds to block 332 if the customer card is configured for secure authentication. The process steps for a card not participating in secure authentication is not shown. At block 332, the merchant server sends an authentication request to an appropriate ACS. The appropriate ACS may be determined, for example, based in part on the PAN.

The system then proceeds to block 340 where an issuer ACS may query the cardholder for a passcode. The passcode may be, for example, a password, PIN, and the like, or some other customer security identifier. The system then proceeds to decision block 350 and determines the type of passcode associated with the card. The ACS can determine, for example, whether the particular payment card uses a password or PIN for authentication purposes. The ACS may determine the type of passcode associated with the card based in part on the PAN.

If the ACS determines a passcode is the type of password, the ACS proceeds to block 352 and performs password authentication. To authenticate a password, the ACS may query the customer for the password and receive the password in response. The ACS can then authenticate the password. In one embodiment, the ACS determines a Secure Hashing Algorithm (SHA-1) hash of the password and compares the value to a previously stored hash value. If the two compare, the password is authenticated. The system proceeds to block 360.

Returning to decision block 350, if the ACS determines the passcode is a PIN, such as when the customer submits a debit card number for payment, the system proceeds to block 354 and the system performs PIN authentication. Flowcharts of different PIN authentication embodiments are provided in FIGS. 4 and 5. After authenticating the PIN, the system proceeds to block 360.

After authenticating the passcode, the ACS, in block 360, returns an authentication message to the requesting merchant server. The system then proceeds to block 370 where the merchant server receives the authentication message from the ACS and validates the message. The ACS may validate the message in order to minimize the likelihood of false authentication messages. The ACS may validate the message for example, by verifying certain parameters or fields that may be included in the authentication message. For example, a digital signature created by the ACS may be validated by the merchant server. In addition, a unique identification number generated for each authentication may be generated by the ACS in the authentication request and the ACS may verify that the unique identification number is included in a field of the authentication message. The desired field may be encrypted to minimize the possibility of a false field value.

After validating the authentication message, the merchant server proceeds to block 380 if the passcode authenticates the user PAN. In block 380 the merchant server initiates payment authorization. If the passcode does not authenticate the PAN, the system may proceed to an error process (not shown).

Figure 4:
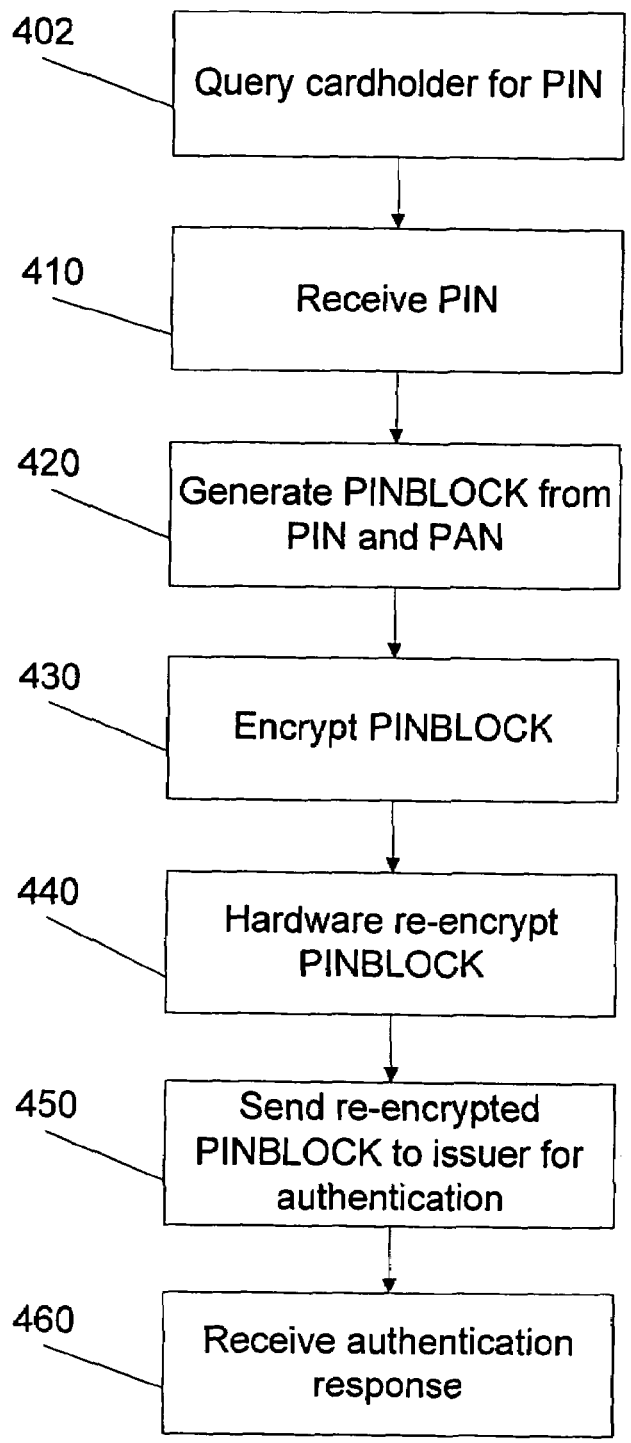
FIG. 4 is a flowchart of an embodiment of a passcode authentication process.

FIG. 4 is a flowchart of an embodiment of a PIN authentication process 354, such as the PIN authentication process of FIG. 3. The process 354 begins at block 402 where the ACS queries the customer, via the browser and cardholder device, for the PIN corresponding to the previously submitted PAN. The ACS then proceeds to block 410 to wait for and receive the PIN from the cardholder device.

The ACS and cardholder device initiate a new SSL connection that is independent of the SSL connection between the cardholder device and the merchant server, the customer PIN supplied by the customer is not exposed to the merchant server, and is not recoverable by the merchant server using the SSL keys currently used by the merchant server to communicate with the cardholder device.

Once the ACS receives the PIN from the cardholder device, the ACS proceeds to block 420 to generate a PINBLOCK. The ACS can generate the PINBLOCK, for example, using a combination of PAN and PIN values, solely PIN values, or a combination of PIN values and other information. The PINBLOCK can be, for example, a predetermined format for communicating PIN information. In one embodiment the PINBLOCK is an ISO 9564 Format-0 PINBLOCK, also referred to as an ANSI X9.8 Format-0 PINBLOCK or an RG7100 Format 05 PINBLOCK. The ACS may need to recover the SSL encrypted PIN in order to generate the PINBLOCK. Thus, there is a possibility that the PIN is available in clear, non-encrypted, form in the ACS memory.

The ACS then proceeds to block 430 and encrypts the PINBLOCK using a predetermined encryption algorithm. For example, the encryption algorithm may be stored in a first hardware security module (HSM1). The first HSM can store a local Zone Protection Key (ZPK). The HSM can be configured to encrypt the PINBLOCK using the local ZPK. The encryption algorithm may be, for example, a symmetric or asymmetric key based encryption algorithm. In one embodiment, the encryption algorithm is a DES encryption algorithm.

The first hardware security module (HSM1) can be implemented in hardware or in software. If the HSM1 is implemented in software, the HSM1 can be implemented within the ACS such that the SSL decryption and PINBLOCK generation is conducted as part of the HSM1. Alternatively, the HSM1 may be implemented in software in a device external to the ACS. Thus, the clear form of the PIN may only be available in memory within the HSM1. Because the HSM1 can be configured to handle data securely, such as in accordance with Federal Information Processing Standards (FIPS) security standards, the clear form of the PIN in the HSM1 may only exist in a temporary register and therefore poses a minimal security hazard.

The system proceeds to block 440 and the PINBLOCK that is encrypted by the HSM1 is re-encrypted using the second Hardware Security Module (HSM2). The HSM2 can be configured to decrypt the HSM1 encrypted PINBLOCK prior to re-encryption. In an embodiment, the software encrypted PINBLOCK is provided to HSM2 which is implemented in hardware. In another embodiment, HSM2 can be implemented as a Thales RG7100 hardware security module. The HSM2 can be configured to decrypt the HSM1 encrypted PINBLOCK and encrypt the PINBLOCK using an Acquirer Working Key (AWK) to generate an AWK encrypted PINBLOCK.

The system proceeds to block 450 where the ACS communicates the AWK encrypted PINBLOCK to an issuer for authentication. In one embodiment, the ACS communicates the AWK encrypted PINBLOCK to an Internet Payment Gateway Server (IPGS). The IPGS can be coupled to an issuer server and may communicate the AWK encrypted PINBLOCK to the issuer for authentication.

The system proceeds to block 460 where the ACS waits for and receives an authentication response from the issuer. In the embodiment discussed above, the issuer may send an authentication message through an IPGS, and the IPGS may transmit the message to the ACS. The use of an IPGS may be particularly advantageous where a first network connects the ACS to the IPGS and a second network connects the IPGS to the issuer.

Figure 5:
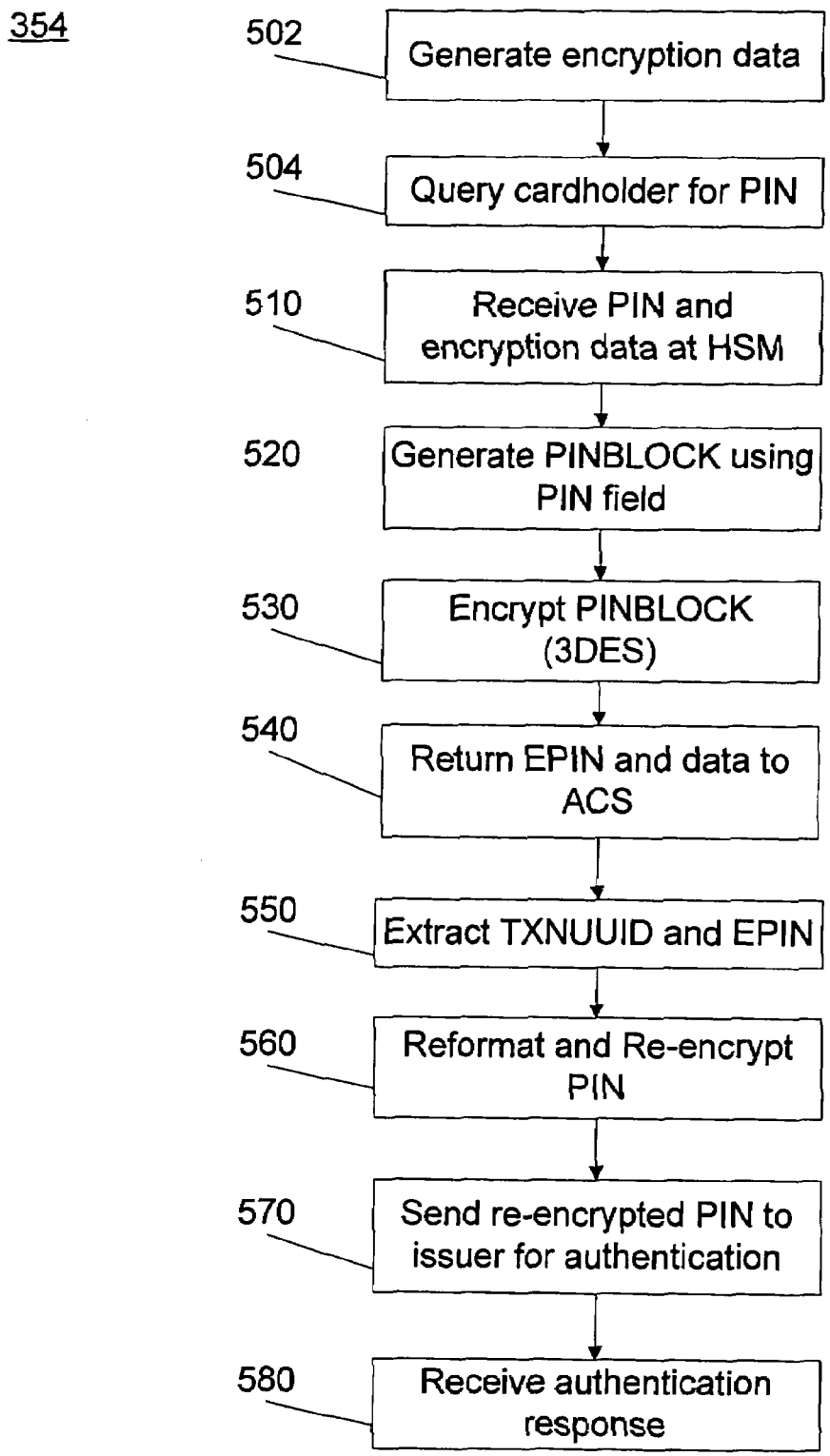
FIG. 5 is a flowchart of an embodiment of a passcode authentication process.

FIG. 5 is a flowchart of another embodiment of a PIN authentication process 354, such as the PIN authentication process of FIG. 3. The process described in FIG. 5 allows the PIN to be transmitted from the cardholder device directly to an HSM and does not expose the PIN in clear form outside of an HSM. The ACS receives encrypted versions of the PIN and may not have the ability to recover the clear form of the PIN.

The process 354 begins at block 502 where the ACS in combination with the HSMs generate data that will be used in subsequent encryption steps. The data can include, for example, a unique transaction ID that is generated for the authentication transaction, a destination address, a redirect address that can be used to redirect a communication to a desired destination address, a redirect type such as a type that can be used with http type redirect instructions, and a message authentication code that may be generated by one or more HSMs that will be used in the encryption process.

Once the encryption data is generated, the system proceeds to block 504 where the ACS sends a query to the cardholder device asking the cardholder for the PIN. The query can include the previously generated encryption data. The encryption data may be hidden, such that the customer does not view the information.

The system then proceeds to block 510 to wait for the customer to submit the PIN. The customer can input the PIN and submit the PIN to the system. The PIN and previously generated encryption data are then sent directly to the first, or front end HSM (HSM1) whose address can be included in the encryption data as a destination address. Thus, although the ACS can generate and send the PIN request to the cardholder device, the cardholder device can be instructed to send the PIN directly to an HSM. Additionally, the cardholder device and HSM1 can initiate a new SSL connection. A new SSL connection between the cardholder device and the HSM1 allows the communication between the two devices to be secure, and can be secured even with respect to the ACS that initiated the communication. Thus, in block 510, the HSM1 receives the PIN and at least a portion of the previously generated encryption data.

The system then proceeds to block 530 where the HSM1 generates a PINBLOCK. In one embodiment, the HSM1 is a hardware HSM. The HSM1 can be configured to generate an ISO Format-1 PINBLOCK using the PIN. In another embodiment, the HSM1 can generate an ISO Format-1 PINBLOCK using the PIN and PAN, where the PAN can be supplied from the customer or the ACS. The HSM1 recovers the clear form of the PIN from the SSL encrypted message, but the clear form is maintained in accordance with the security of the HSM1. For example, the HSM1 may provide security in accordance with FIPS 140-1, FIPS 140-2, or some other security standard. In one embodiment, the HSM1 is configured to provide a level of security in accordance with FIPS 140-2, level 3. In another embodiment, the HSM1 is configured to provide a level of security in accordance with FIPS 140-2, level 2.

After the PINBLOCK is generated by the HSM1, the system proceeds to block 530 and the HSM1 generates an encrypted PIN (EPIN). In one embodiment, the HSM1 generates an encrypted PIN using triple DES encryption using a local Zone Protection Key (ZPK).

After the HSM1 generates the EPIN, the system proceeds to block 540 where the HSM1 communicates the EPIN back to the ACS. The HSM1 can, for example, be supplied the destination address of the ACS using the encryption data supplied with the PIN. In one embodiment, the ACS address is included as the redirect address within the encryption data. In another embodiment, the HSM1 communicates the EPIN information and at least a portion of the encryption data to the ACS as arguments in a redirection URL. For example http status codes 302 or 303 may be used to trigger this scenario.

The system proceeds to block 550 where the ACS extracts the EPIN and desired encryption data received from the HSM1. As described above, the ACS can extract the EPIN and encryption data such as the unique transaction ID from arguments in the URL. The ACS may validate the received information, for example, by comparing the received unique transaction ID against the previously generated value of the ID.

The system proceeds to block 560. In block 560, the ACS provides the information to the second or back end HSM (HSM2). The HSM2 reformats and re-encrypts the EPIN. The HSM2 can be configured to decrypt the EPIN to recover the clear form of the PIN. The HSM2 can then re-encrypt the PIN using the Acquirer Working Key to produce an ISO 9564 Format-0 AWK encrypted PINBLOCK. In one embodiment, the HSM1 and HSM2 are separate hardware security modules. In another embodiment, the HSM1 and the HSM2 are implemented in a single hardware security module. In another embodiment, the front end HSM can be an nCipher hardware security module and the back end HSM can be a Thales RG7100 hardware security module. The HSM1 and HSM2 can be co-located or may be remotely located from each other.

The system proceeds to block 570 where the ACS receives the AWK encrypted PINBLOCK from the HSM2 and communicates the AWK encrypted PINBLOCK to an issuer for authentication. The ACS may send, for example, the AWK encrypted PINBLOCK to an IPGS. The IPGS may communicate the AWK encrypted PINBLOCK to the issuer for authentication.

The system then proceeds to block 580 where the ACS waits for the authentication response and eventually receives the authentication response from the issuer. An IPGS may communicate the authentication response to the ACS based on an authentication message received from the issuer.

FIG. 6 is an embodiment of a passcode entry form 600 used in one embodiment of a passcode authentication system, such as the system of FIG. 1 implementing the process embodiment of FIG. 5. The form is configured as an HTML form that can be sent by the ACS to the cardholder device. The form includes hidden fields that are used to store the previously generated encryption data. The form includes, for example, a field that configures an SSL connection with an HSM1 610. The form may also include a field used to communicate the unique transaction ID 620 or unique authentication session ID. The form may also include fields that identify the redirect address 630 and the redirect type 640. The form can also include a message authentication code 650 that identifies the HSM1 and the authentication session. The message authentication code 650 can be used to ensure that the HSM1 is used by the ACS.

FIG. 7 is an example of a table 700 of encryption data fields used in an embodiment of a secure authentication system. The encryption data can include, for example, a TXNUUID field 710 that can be a unique transaction ID. The encryption data can also include a RDIR_URL field 720 that represents a base URL that is used to redirect communication from the HSM1 back to the ACS. The encryption data can also include a RDIR_TYPE field 730 that can indicate the http redirect type the HSM1 should return. For example, the redirect type can identify 302 or 303 redirect types. The encryption data can also include a GEP_MAC field 740 that represents a message authentication code that can be used to ensure that the HSM1 is used by the ACS. The GEP_MAC field value can be generated, for example, by the HSM1. The HSM1 can be configured to generate the field value by encrypting, for example, the TXNUUID, RDIR_URL, and RDIR_TYPE field values using the local zone protection key.

FIG. 8 is an example of a table 800 of return encryption fields used in an embodiment of a secure authentication system. In this embodiment, the return encryption fields includes an EPIN1 encrypted PIN field. The EPIN1 field can be, for example, an ISO 9564 Format-1 PINBLOCK encrypted using a key that is shared by the HSM1 and HSM2. In an embodiment, the value can be base 64 encoded prior to being used as a field in the redirection URL.

Figure 9:
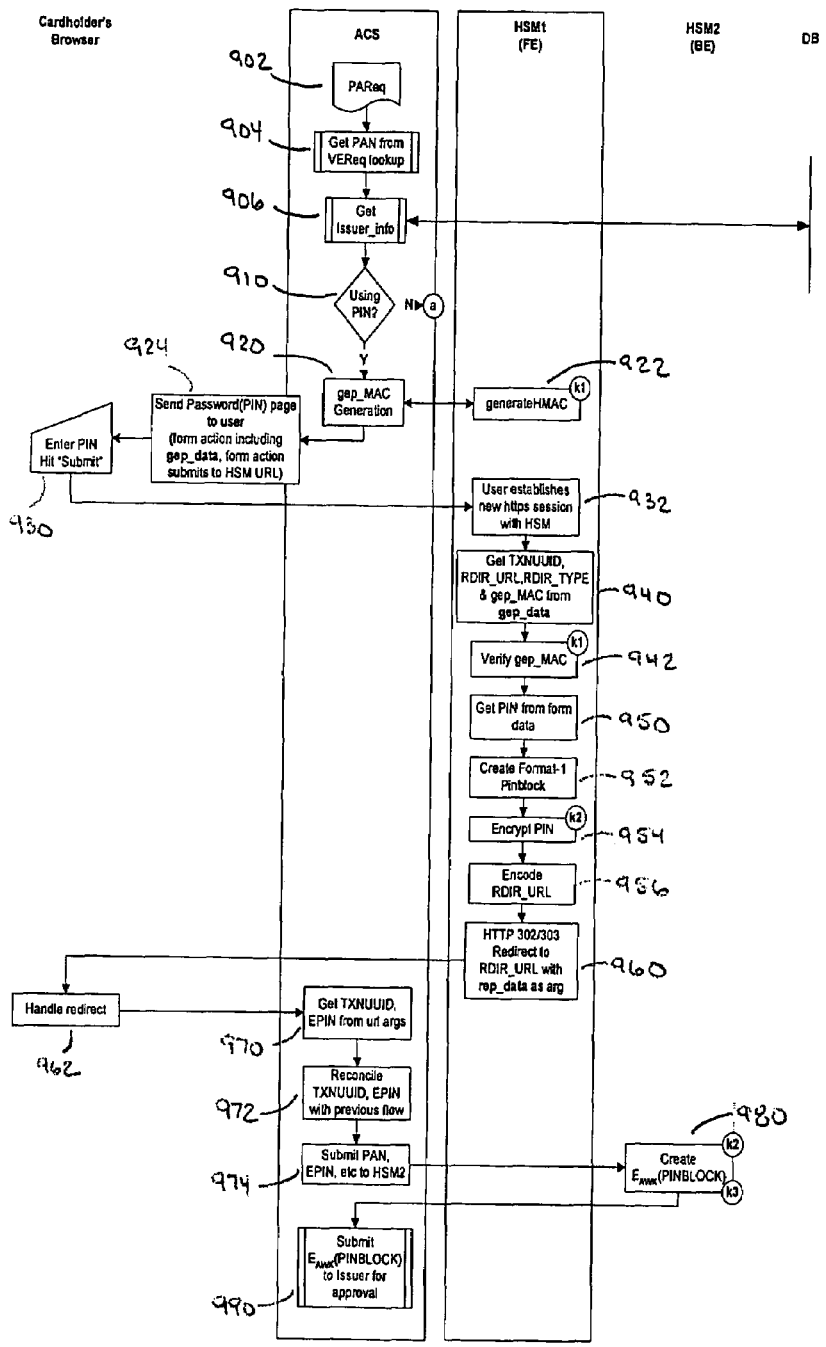
FIG. 9 is a flowchart of an embodiment of a secure authentication process.

FIG. 9 is a detailed flowchart of an embodiment of a secure authentication process 900 that can be implemented, for example, in the system embodiment of FIG. 1. The process 900 begins at block 902 when the ACS receives a payment authentication request. The ACS proceeds to block 904 and retrieves a Primary Account Number (PAN) from, for example, an original verify enrollment request previously received from the merchant server.

The system then proceeds to block 906 where the ACS retrieves issuer information from a database. The issuer information may be based in part on the PAN and may identify whether the payment card is a credit card or a debit card. The system proceeds to decision block 910 where the ACS determines the type of passcode required to authenticate the payment card. For example, the ACS may determine whether a password or PIN is used to authenticate the card.

If a password is used, the system may authenticate the card locally using, for example, an SHA-1 hash of the password (not shown). The system proceeds to block 920 if a PIN is used to authenticate the payment card. In block 920, the ACS generates the encryption data that can accompany the PIN request form. The ACS can generate the TXNUUID, RDIR_URL, and RDIR_TYPE values and can initiate generation of a hashed message authentication code (HMAC) value. The RDIR_URL can be the URL of the ACS. The value of the RDIR_URL may be modified in a later process step.

The ACS can transmit a message to the HSM1 to initiate generation of the HMAC value. The HSM1 can be referred to as a front end HSM because the HSM interfaces with the ACS, and may interface with the cardholder device.

The HMAC value can be the value used in the GEP_MAC field of the encryption data, as shown in the table of FIG. 7. The HSM1 can generate the HMAC value, for example using a first encryption key (k1) stored within the HSM1. The HSM1 can generate the HMAC value, for example, by generating a hash of the TXNUUID, RDIR_URL, and RDIR_TYPE values using the k1 key. The HMAC value can be used as a form of one-way authentication. The HSM1 generates the HMAC and later verifies a received HMAC to determine if it compares with the original HMAC value. Thus, the HMAC value does not contain any values that need to be extracted outside of the HSM1. In fact, the HSM1 may regenerate the HMAC value to verify the authenticity of a message received at the HSM1.

Once the HSM1 generates the HMAC value, it is provided to the ACS. The ACS inserts the HMAC value in the encryption data and generates the PIN request form. The system proceeds to block 924 where the ACS sends the PIN request form to the cardholder device. The form can be configured such that when the customer submits the form the information is directed to the HSM1 and does not need to be routed through the ACS.

The system proceeds to block 930 where the customer receives the PIN request form at the cardholder device. The customer can enter the PIN and submit the form to the HSM1. The system proceeds to block 932 when the form is submitted by the customer.

At block 932 the cardholder device establishes an SSL connection with the HSM1 such that the information provided by the customer, via the cardholder device, can be transmitted in an encrypted form, thereby avoiding exposing the PIN and other personal information in clear form over a public network. After establishing the SSL connection with the cardholder device, the HSM1 proceeds to block 940.

In block 940, the HSM1 retrieves the encryption data from the cardholder message. After the HSM1 obtains the encryption data, the system proceeds to block 942.

In block 942 the HSM1 verifies the retrieved GEP_MAC data. The HSM1 can, for example, re-generate the HMAC value initially generated in block 922 and compare the value to the HMAC value received from the cardholder device. The HSM1 can use the same values and the same key used to generate the initial HMAC value. There is low probability of message tampering or corruption if the two HMAC values are substantially identical.

The GEP_MAC value can be used to ensure that HSM1, which typically creates the encrypted PIN, processes transactions which originated from the ACS. The GEP_MAC verification can be used to avoid random users from hitting HSM1 and tying up the resource.

After verifying the GEP_MAC value, the system proceeds to block 950. At block 950 the HSM1 retrieves the PIN value from the received data. The system proceeds to block 952 and generates a PINBLOCK. The HSM1 can generate a PINBLOCK using a predetermined PINBLOCK format such as a Format-1 PINBLOCK.

The system proceeds to block 954 and generates the encrypted PIN value (EPIN) using a second key value (k2) stored within the HSM1. The second key value (k2) may also be referred to as the back end key. The HSM1 can generate the EPIN value using any number of encryption algorithms. In one embodiment, the HSM1 encrypts the PINBLOCK using triple DES. Alternatively, the HSM1 may use Advanced Encryption Standard (AES), Data Encryption Standard (DES), RSA, Skipjack, Blowfish, SEAL, RC-4, and the like, or some other encryption algorithm.

The second key value (k2) can be a key value that is shared with the HSM2. The second key value (k2) may be a key value that is used to communicate information between the two HSMs and may not be used for communicating with other modules. Thus, although the HSM1 and HSM2 may be located remote from one another, the second key (k2) may be referred to as a local key.

After the HSM1 generates the encrypted PIN value, the system proceeds to block 956 and the HSM1 encodes the redirect URL. In one embodiment, the HSM1 may also optionally generate a new HMAC value using the k1, TXNUUID, and EPIN values. In one embodiment, the RDIR_URL value can be generated by the ACS using, for example the process shown in FIG. 10.

The new HMAC value, which may be referred to as a REP_MAC value, can be used to prevent replay attacks and provide idempotency. That is, the REP_MAC helps prevent the authentication data such as the encrypted PIN from being re-used by the browser such as if a user scrolls back through a browser history. The REP_MAC value can also be used to ensure that the encrypted PIN (EPIN) was generated by HSM1.

After generating the RDIR_URL value, the system proceeds to block 960 where the HSM1 generates a http 302/303 redirect to the redirect URL. The HSM1 can include the TXNUUID and encrypted PIN values as arguments in the URL. The HSM1 communicates the RDIR_URL to the cardholder device.

The system proceeds to block 962 where the cardholder device receives the RDIR_URL and handles the message redirection. The cardholder redirects the message to the redirect URL, which is typically the address of the ACS.

The system proceeds to block 970 where the ACS receives the redirected message from the cardholder device. The ACS can extract the TXNUUID and EPIN values from the message. For example, the ACS can extract the TXNUUID and EPIN values from the URL arguments.

In the system embodiment in which the HSM1 generates an HMAC value and includes the value in the return encrypted data PIN message, the ACS may verify the HMAC value. To verify the HMAC value, the ACS may extract the HMAC value and communicate the value to the HSM1. The HSM1 can receive the HMAC from the ACS and can regenerate the HMAC value with the k1, TXNUUID, and EPIN values. The HSM1 can then compare the received HMAC value to the re-generated HMAC value and can provide the ACS a verification or validation message if the two are substantially the same.

The system then proceeds to block 972 where the ACS reconciles the TXNUUID with the previous values generated by the ACS. The system proceeds to block 974 and submits the PAN, EPIN, and any other values used to generate an AWK encrypted PINBLOCK to the HSM2.

The system proceeds to block 980 where the HSM2 receives the information provided by the ACS. The HSM2 can recover the clear form of the PIN by decrypting the EPIN using the shared second key value (k2). The HSM2 may reformat the PIN in another PINBLOCK format. The HSM2 may also be referred to as the back end HSM because the HSM2 is used to communicate with the issuer and does not typically communicate with the cardholder device or merchant server.

The HSM2 can generate an AWK encrypted PINBLOCK using the AWK that may be stored within the HSM2. The AWK may be a third key (k3) used by the system and may be used by the issuer network to secure communications. The HSM2 may use any type of encryption algorithm, such as one or more of those that may be implemented in the HSM1. The HSM2 communicates the AWK encrypted PINBLOCK to the ACS.

The system proceeds to block 990. In block 990, the ACS receives the AWK encrypted PINBLOCK and submits the PINBLOCK to the issuer for authentication. In one embodiment, the ACS communicates the AWK encrypted PINBLOCK to an IPGS and the IPGS communicates the AWK encrypted PIN to an issuer for authentication.

Figure 10:
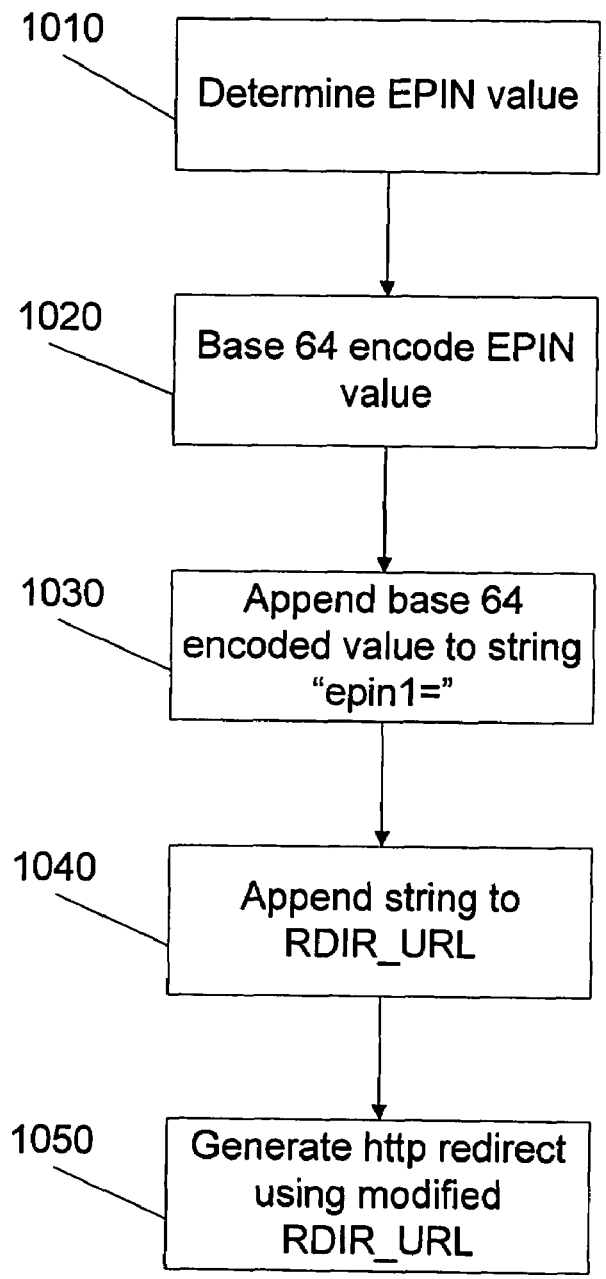
FIG. 10 is a flowchart of an embodiment of a method of encoding the RDIR_URL to include an EPIN.

FIG. 10 is a flowchart of an embodiment of a method 1000 of encoding the RDIR_URL. The method 1000 can be implemented, for example, in the HSM1 of the system of FIG. 1.

The method 1000 begins at block 1010 where the HSM1 determines the EPIN value. As noted in the earlier flowchart discussions, the HSM1 can generate an encrypted PIN value that is communicated to the HSM2. The HSM1 may encode the RDIR_URL as part of the EPIN generation process, or may encode the RDIR_URL one or more process steps after generating the EPIN. The HSM1 may, for example, retrieve the EPIN from memory within the HSM1.

The HSM1 then proceeds to block 1020 and base 64 encodes the EPIN value. After base 64 encoding the EPIN value the HSM1 proceeds to block 1030 and appends the base 64 encoded value to a string having one or more characters, such as "epin1=".

After appending the base 64 encoded EPIN to the string, the HSM1 proceeds to block 1040 and appends the string to the RDIR_URL previously generated by the ACS. The string value can be an argument of the RDIR_URL. The HSM1 then proceeds to block 1050 and generates an http redirect using the modified RDIR_URL as the redirect address.

The disclosed system and methods can be used to securely authenticate a passcode, such as a payment card PIN. The system can authenticate a payment card PIN received over a public network without exposing the clear form of the PIN to a publicly accessible device. The PIN may be received from the customer using an encrypted format over a public network. In one embodiment, the system can receive a customer PIN using a SSL connection to communicate the PIN over the Internet. The secure authentication system can reformat the PIN by stripping the front end encryption and applying a back end encryption without exposing the clear form of the PIN.

Although specific embodiments have been described in the above block diagrams and flowcharts, the system may be modified without departing from the scope of the disclosure. In one such modified embodiment, a single HSM is used in place of two distinct HSMs. Alternatively, the function performed by the HSM1 and HSM2 can be implemented within a single HSM.

If a single HSM is used, the intermediate step of encoding the recovered clear form of the PIN using a local ZPK may be eliminated. Rather, a single HSM can be configured to recover the clear form of the PIN, such as by decrypting the SSL encrypted PIN provided by the ACS or the cardholder device. The HSM can then generate the AWK encoded PINBLOCK without generating the EPIN using the intermediate local ZPK and intermediate encryption algorithm.

The above description of the disclosed embodiments is provided to enable any person skilled in the art to make or use the disclosure. Various modifications to these embodiments will be readily apparent to those skilled in the art, and the generic principles defined herein may be applied to other embodiments without departing from the scope of the disclosure. Thus, the disclosure is not intended to be limited to the embodiments shown herein but is to be accorded the widest scope consistent with the principles and novel features disclosed herein.

What is claimed is:

1. A secure passcode authentication system, the system comprising:
    an Access Control Server (ACS) configured to receive a request for passcode authentication of a Primary Account Number (PAN) from a merchant server, and configured to request a passcode corresponding to the PAN from a cardholder device, wherein the ACS is associated with an issuer of the PAN;
    a front end Hardware Security Module (HSM) coupled to the ACS, and configured to receive the passcode in an encrypted format and generate an encrypted passcode using a local encryption key; and
    a back end HSM configured to receive the encrypted passcode from the front end HSM and further configured to recover a clear form of the passcode, generate a back end encrypted passcode, and communicate the back end encrypted passcode to an authentication network, wherein the system authenticates the passcode, wherein the ACS is further configured to receive an authentication message from the authentication network.

2. The system of claim 1, wherein the request for passcode authentication comprises a request for a Personal Identification Number (PIN) authentication.

3. The system of claim 1, wherein the ACS is further configured to generate a unique transaction identification and include the unique transaction identification as a hidden field in the request for the passcode.

4. The system of claim 3, wherein the front end HSM is configured to generate a hash value based in part on the unique transaction identification, and wherein the ACS is configured to include the hash value as an additional hidden field in the request for the passcode.

5. The system of claim 1, wherein the request for the passcode includes an instruction to direct the passcode to the front end HSM.

6. The system of claim 1, wherein the front end HSM comprises a software HSM.

7. The system of claim 1, wherein the front end HSM comprises a hardware HSM.

8. The system of claim 1, wherein the encrypted format comprises a Secure Sockets Layer (SSL) encrypted format.

9. The system of claim 1, wherein the front end HSM is configured to receive a cardholder encrypted passcode from the ACS.

10. The system of claim 1, wherein the front end HSM is configured to receive a cardholder encrypted passcode from a cardholder device.

11. The system of claim 1, wherein the back end HSM is configured to generate the back end encrypted passcode by generating a PINBLOCK using the clear form of the passcode and encrypting the PINBLOCK using an Acquirer Working Key (AWK).

12. The system of claim 1, wherein the authentication network comprises an Internet Payment Gateway Server (IPGS).

13. The system of claim 12, wherein the authentication network further comprises an issuer server coupled to the IPGS.

14. A secure passcode authentication system, the system comprising:
    an Access Control Server (ACS) configured to receive a request for Personal Identification Number (PIN) authentication of a Primary Account Number (PAN), and configured to generate a request for a PIN corresponding to the PAN, the request for the PIN including hidden fields comprising a unique transaction identifier and a hash value;
    a front end Hardware Security Module (HSM) coupled to the ACS, and configured to generate the hash value based in part on the unique transaction identifier, and further configured to receive an encrypted PIN, decrypt the PIN to recover a clear form of the PIN, and generate a local encrypted PIN using a local encryption key; and
    a back end HSM configured to receive the local encrypted PIN from the front end HSM and further configured to recover a clear form of the PIN from the local encrypted PIN, generate an Acquirer Working Key (AWK) encrypted PIN, and communicate the AWK encrypted PIN to an authentication network.

15. The system of claim 14, wherein the front end HSM generates the local encrypted key using a triple DES algorithm.

16. A secure passcode authentication system, the system comprising:
    an Access Control Server (ACS) configured to receive a request for Personal Identification Number (PIN) authentication of a Primary Account Number (PAN), and configured to generate a request for a PIN corresponding to the PAN, the request for the PIN including an instruction to provide the PIN to a destination address; and a front end Hardware Security Module (HSM) having said destination address and coupled to the ACS, and configured to receive an encrypted PIN, decrypt the PIN to recover a clear form of the PIN, and generate an Acquirer Working Key (AWK) encrypted PIN using an AWK encryption key, and configured to communicate the AWK encrypted PIN to an authentication network.

17. A method for providing secure passcode authentication, the method comprising:

requesting a Personal Identification Number (PIN) corresponding to a Primary Account Number (PAN) wherein requesting the PIN includes generating a unique transaction identifier, generating a hash value with a front end Hardware Security Module (HSM) based in part on the unique transaction identifier, generating a query having the unique transaction identifier and hash value as fields in the query, and communicating the query;

receiving an encrypted PIN in the front end Hardware Security Module (HSM) in response to the request;

generating a PINBLOCK based in part on the encrypted PIN;

encrypting the PINBLOCK using a local key in a front end Hardware Security Module (HSM) to generate a local key encrypted PINBLOCK;

decrypting the local key encrypted PINBLOCK with a back end HSM;

generating a back end encrypted PIN with the back end HSM;

communicating the back end encrypted PIN to an authentication network; and receiving an authentication response from the authentication network.

18. The method of claim 17, wherein requesting the PIN comprises:

generating a query having an instruction directing a query response be directed to a destination address corresponding to the front end HSM; and communicating the query over an Internet connection to a cardholder device.

19. The method of claim 17, wherein receiving the PIN comprises receiving a Secure Sockets Layer (SSL) encrypted PIN.

20. The method of claim 19, wherein receiving the PIN further comprises receiving the SSL encrypted PIN at an Access Control Server (ACS).

21. The method of claim 19, wherein receiving the PIN further comprises receiving the SSL encrypted PIN from a cardholder device at the front end HSM.

22. The method of claim 17, wherein the front end HSM comprises a software HSM implementation within an Access Control Server (ACS).

23. The method of claim 17, wherein encrypting the PIN-BLOCK comprises encrypting the PINBLOCK using a triple DES encryption algorithm.

24. The method of claim 17, wherein generating the back end encrypted PIN comprises:

generating a back end PINBLOCK from a clear form of the PIN; and encrypting the PIN with the back end HSM using an Acquirer Working Key (AWK).

25. A method for providing secure passcode authentication, the method comprising:

receiving an encrypted Personal Identification Number (PIN) corresponding to a Primary Account Number (PAN) in a front end Hardware Security Module (HSM) over a Secured Sockets Layer (SSL) internet connection between a cardholder device and the front end HSM, wherein the PIN is exclusively SSL encrypted;

decrypting the encrypted PIN in the front end Hardware Security Module (HSM) to generate a clear form of the PIN;

generating a PINBLOCK based in part on the clear form of the PIN;

generating in a back end HSM a back end encrypted PIN based in part on the PINBLOCK;

communicating the back end encrypted PIN to an authentication network; and receiving an authentication response from the authentication network.

26. The method of claim 25, wherein the front end HSM comprises the back end HSM.

27. The method of claim 25, wherein generating the back end encrypted PIN comprises generating an Acquirer Working Key (AWK) encrypted PIN.

28. A method for providing secure passcode authentication, the method comprising:

generating encryption data;

querying a cardholder for a Personal Identification Number (PIN) corresponding to a Primary Account Number (PAN);

receiving in a front end Hardware Security Module (HSM) an encrypted PIN and at least a portion of the encryption data from the cardholder in response to the query;

generating a clear form of the PIN based in part on the encrypted PIN;

generating a PINBLOCK based in part on the clear form of the PIN;

encrypting the PINBLOCK in a front end Hardware Security Module (HSM) using triple DES encryption to generate an encrypted PIN (EPIN);

decrypting the EPIN in a back end HSM to recover the clear form of the PIN;

encrypting the clear form of the PIN in the back end HSM using an Acquirer Working Key (AWK) to generate an AWK encrypted PIN;

communicating the AWK encrypted PIN to an authentication network; and receiving an authentication response.

29. The system of claim 1, further comprising a Directory Server configured to verify a Primary Account Number's eligibility to participate in secure passcode authentication.

30. The system of claim 16, wherein the instruction to provide a PIN to a destination address is an HTTP redirect instruction.

31. The method of claim 28, wherein the encryption data comprises a transaction ID, a base redirection url, an http redirect type.

32. A method for providing secure passcode authentication, the method comprising:

generating encryption data, wherein the encryption data comprises a transaction ID, a base redirection url, and an http redirect type, wherein the encryption data further comprises a hashed message authentication code based on the transaction ID, the base redirection URL, and the http redirect type;

querying a cardholder for a Personal Identification Number (PIN) corresponding to a Primary Account Number (PAN);

receiving in a front end Hardware Security Module (HSM) an encrypted PIN and at least a portion of the encryption data from the cardholder in response to the query;

generating a clear form of the PIN based in part on the encrypted PIN;
generating a PINBLOCK based in part on the clear form of the PIN;
encrypting the PINBLOCK in a front end Hardware Security Module (HSM) using triple DES encryption to generate an encrypted PIN (EPIN);
decrypting the EPIN in a back end HSM to recover the clear form of the PIN;
encrypting the clear form of the PIN in the back end HSM using an Acquirer Working Key (AWK) to generate an AWK encrypted PIN;

communicating the AWK encrypted PIN to an authentication network; and receiving an authentication response.

33. The method of claim 1 wherein the access control server, the front end hardware security module, and the back end are co-located.

34. The system of claim 1, wherein the ACS is further configured to return an authentication response to the merchant server.

* * * * *